United States Patent
Hofmann et al.

(10) Patent No.: US 11,338,513 B2
(45) Date of Patent: May 24, 2022

(54) PLANT FOR ADDITIVELY MANUFACTURING AT LEAST ONE THREE-DIMENSIONAL OBJECT

(71) Applicant: CONCEPT LASER GMBH, Lichtenfels (DE)

(72) Inventors: Alexander Hofmann, Weismain (DE); Carsten Röblitz, Neustadt bei Coburg (DE)

(73) Assignee: CONCEPT LASER GMBH, Lichtenfels (DE)

(*) Notice: Subject to any disclaimer, the term of this patent is extended or adjusted under 35 U.S.C. 154(b) by 205 days.

(21) Appl. No.: 16/293,568

(22) Filed: Mar. 5, 2019

(65) Prior Publication Data

US 2020/0147879 A1    May 14, 2020

(30) Foreign Application Priority Data

Nov. 10, 2018    (EP) ..................... 18205553

(51) Int. Cl.
*B29C 64/307* (2017.01)
*B33Y 30/00* (2015.01)
(Continued)

(52) U.S. Cl.
CPC ............ *B29C 64/307* (2017.08); *B22F 12/00* (2021.01); *B23K 26/34* (2013.01); *B23K 26/354* (2015.10);
(Continued)

(58) Field of Classification Search
CPC ....... B22F 10/00; B23K 26/34; B23K 26/354; B28B 1/001; B29C 64/20; B29C 64/245; B29C 64/307; B33Y 30/00; B33Y 40/00
(Continued)

(56) References Cited

U.S. PATENT DOCUMENTS

| 9,610,735 B2 * | 4/2017 | Yoo ..................... B29C 64/35 |
| 2018/0133798 A1 | 5/2018 | Stammberger et al. |

(Continued)

FOREIGN PATENT DOCUMENTS

| EP | 3321006 A1 | 5/2018 |
| EP | 3321067 A1 | 5/2018 |

(Continued)

OTHER PUBLICATIONS

European Search Report Corresponding to EP18205553 dated Apr. 23, 2019.

*Primary Examiner* — Scott R Kastler
*Assistant Examiner* — Michael Aboagye
(74) *Attorney, Agent, or Firm* — Dority & Manning, P.A.

(57) ABSTRACT

Plant for additively manufacturing at least one three-dimensional object, comprising at least one process station for an additive manufacturing process, wherein at least one functional component, preferably a lifting device for a powder module, of the process station is at least partially enclosed by a housing structure of the process station, wherein the process station is coupled or can be coupled with at least one powder module, wherein the housing structure comprises at least one opening for loading and/or unloading the at least one powder module into or from the process station, wherein a platform is provided that is arrangeable or arranged adjacent to the at least one opening, wherein the platform comprises at least one positioning unit with at least one positioning surface for positioning a module carrier which is adapted to carry the at least one powder module.

20 Claims, 3 Drawing Sheets

(51) Int. Cl.
| | |
|---|---|
| *B33Y 40/00* | (2020.01) |
| *B29C 64/20* | (2017.01) |
| *B28B 1/00* | (2006.01) |
| *B22F 3/105* | (2006.01) |
| *B23K 26/34* | (2014.01) |
| *B23K 26/354* | (2014.01) |
| *B22F 12/00* | (2021.01) |
| *B22F 10/10* | (2021.01) |

(52) U.S. Cl.
CPC .............. *B28B 1/001* (2013.01); *B29C 64/20* (2017.08); *B33Y 30/00* (2014.12); *B33Y 40/00* (2014.12); *B22F 10/10* (2021.01)

(58) Field of Classification Search
USPC ......... 266/137, 160; 264/308, 497, 113, 401
See application file for complete search history.

(56) References Cited

U.S. PATENT DOCUMENTS

| | | |
|---|---|---|
| 2018/0133963 A1 | 5/2018 | Bechmann et al. |
| 2018/0133966 A1 | 5/2018 | Plachner |
| 2019/0160750 A1* | 5/2019 | Morral .................. B29C 64/245 |

FOREIGN PATENT DOCUMENTS

| | | | |
|---|---|---|---|
| WO | WO2017194142 | * 11/2017 | ............. B33Y 30/00 |
| WO | WO2017194142 A1 | 11/2017 | |

* cited by examiner

PLANT FOR ADDITIVELY MANUFACTURING AT LEAST ONE THREE-DIMENSIONAL OBJECT

CROSS-REFERENCE TO RELATED APPLICATIONS

This application claims priority to European Patent Application serial no. 18 205 553.3 filed Nov. 10, 2018, the contents of which is incorporated herein by reference in its entirety as if set forth verbatim.

BACKGROUND

The invention relates to a plant for additively manufacturing at least one three-dimensional object, comprising at least one process station for an additive manufacturing process, wherein at least one functional component, preferably a lifting device for a powder module, of the process station is at least partially enclosed by a housing structure of the process station, wherein the process station is coupled or can be coupled with at least one powder module, wherein the housing structure comprises at least one opening for loading and/or unloading the at least one powder module into or from the process station.

Plants for additively manufacturing three-dimensional objects are generally known from prior art. Such a plant may comprise one or more process stations for performing the additive manufacturing process. A process station may, for example, be or comprise an additive manufacturing apparatus, e.g. a laser sintering or laser melting apparatus, or a process station may be a post-processing or pre-processing station for preparing the module before the additive manufacturing process or after an additive manufacturing process has been finished. Pre-processing stations may, inter alia, involve a refill station in which build material can be refilled into a powder module, in particular a dose module. Post-processing stations may, inter alia, involve a handling station or a sieving station, in which build material can be removed from a powder module, for example a build module or an overflow module, wherein in the post-processing station an unpacking process may be performed in which an additively built object can be unpacked from non-consolidated build material surrounding the additively built object.

In such plants, it is further known that the powder modules have to be loaded into the respective process station, e.g. in advance to the process performed via the process station and unloaded from the process station, e.g. after the process performed on the process station is finished. Usually, the process station comprises a housing structure enclosing at least one functional component of the process station, for example a lifting device via which a powder module can be lifted to an operational position or via which the carrying element that carries the build material during the build material during an additive manufacturing process can be controlled, in particular moved.

The housing structure usually has an opening through which the powder module can be loaded into the process station and unloaded from the process station. Further, it is known from prior art that the area around the opening, in particular the opening itself, has to be protected from an interaction with an operator or service personnel of the plant, as the module being loaded and unloaded may pose a potential hazard to the health of the operator or service personnel, as body parts may come in the movement path of the powder module which could cause serious injury. Thus, in plants known from prior art the area in which an operator or service personnel may interact with the process station and the movement paths of the powder modules, in particular openings via which the powder modules are loaded into or unloaded from the process station are spatially separated. The separation of the areas in which powder modules may move or may be loaded into the apparatus and areas in which an operator or service personnel may interact with the process station, poses strict requirements and limitations to the freedom of designing and arranging process stations significantly.

BRIEF SUMMARY

It is an object of the present invention to provide an improved plant for additively manufacturing at least one three-dimensional object, wherein the safety of loading and unloading processes of powder modules is improved and the design freedom is enhanced.

The object is inventively achieved by an apparatus according to claim 1. Advantageous embodiments of the invention are subject to the dependent claims.

The plant described herein is a plant for additively manufacturing three-dimensional objects, e.g. technical components. The plant may comprise a number of process stations, e.g. a pre-processing station, a post-processing station and an apparatus for additively manufacturing three-dimensional objects, for example by means of successive selective layerwise consolidation of layers of a powdered build material ("build material") which can be consolidated by means of an energy source, e.g. an energy beam, in particular a laser beam or an electron beam.

A respective build material can be a metal, ceramic or polymer powder. A respective energy beam can be a laser beam or an electron beam. A respective apparatus can be an apparatus in which an application of build material and a consolidation of build material is performed separately, such as a selective laser sintering apparatus, a selective laser melting apparatus or a selective electron beam melting apparatus, for instance. Alternatively, the successive layerwise selective consolidation of build material may be performed via at least one binding material. The binding material may be applied with a corresponding application unit and, for example, irradiated with a suitable energy source, e.g. a UV light source.

The additive manufacturing apparatus may comprise a number of functional units which are used during its operation. Exemplary functional units are a process chamber, an irradiation device which is adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

The pre-processing station may comprise at least one functional component for pre-processing a powder module, e.g. a refill station in which build material can be filled into a respective chamber of a powder module. A post-processing station may also comprise at least one functional component, e.g. a handling station or an unpacking station, respectively, in which non-consolidated build material can be removed from an object that has been additively built in an additive manufacturing process. Post-processing stations may further involve or be built as sieving stations in which non-consolidated build material that has been used in an additive manufacturing process can be sieved for reuse in another additive manufacturing process.

As described before, the invention relates to a plant for additively manufacturing at least one three-dimensional object with a process station into which powder modules can be loaded and from which powder modules can be unloaded. The invention is based on the idea that a platform is provided which is arrangeable or arranged adjacent to the at least one opening, wherein the platform comprises at least one positioning unit with at least one positioning surface for positioning a module carrier which is adapted to carry the at least one powder module. Thus, the at least one powder module may be loaded into the process station, e.g. the additive manufacturing apparatus, via the platform, in that a module carrier which is used to carry the at least one powder module, i.e. inside a receiving section of the module carrier, can be coupled with the positioning unit that provides a positioning surface for positioning the module carrier.

Thus, during the operation of the process station the platform may be arranged in front of the opening, wherein a module carrier may be placed onto the platform. By placing the module carrier onto the platform, the positioning unit interacts via its positioning surface with the module carrier for positioning the module carrier on the platform. Therefore, a defined spatial relation can be generated between the module carrier and the opening, i.e. the module carrier may be placed or positioned in a defined relative position to the opening to ensure that the powder module carried via the powder module carrier can be loaded into the process station through the opening or unloaded from the process station through the opening.

The term "powder module" may relate to any arbitrary module of the plant that is adapted to receive and/or store and/or provide build material and which can be coupled and decoupled from the process station. The powder module may, inter alia, be built as dose module for providing fresh build material in an additive manufacturing process or as a build module that is adapted to carry the powder bed in which the object is additively built, e.g. the build material is selectively and successively consolidated in a layer-by-layer manner. Further, the term "powder module" may relate to the overflow module which receives surplus build material which cannot be distributed in the build plane during additive manufacturing processes.

The plant may involve a plurality of (different) powder modules, wherein the individual powder modules may be interchanged during the same manufacturing process, e.g. to provide fresh build material, if a powder chamber of the dose module is empty or an overflow module is full or the like. To move the module carriers to and from the process station mobile units may be used or the module carrier may be moved manually. Further, an arbitrary number of process stations may be assigned to the same plant, typically involving at least one additive manufacturing apparatus, a post-processing station and a pre-processing station. Of course, multiple additive manufacturing apparatuses may be assigned to the same plant, involving one or more pre-processing stations and post-processing stations.

The term "platform" may refer to a pedestal, podium or stairs or the like which can be placed in front of the process station for providing an area in which an operator or service personnel may walk and/or interact with the process station, e.g. interact with the glove box, a process chamber window or with a human machine interface, such as a control device for controlling at least one operation of the process station. The platform may also be understood as "front steps" being arranged in front of the process station.

By placing the module carrier onto the platform, in particular onto the positioning unit, it is possible to position the module carrier in a defined spatial relationship with respect to the opening in the housing structure of the process station. The relative position is preferably chosen in that the opening in the process chamber is sealed providing a protection against interaction of a human being with the functional components inside the housing structure of the process station and the inside the module carrier. In other words, it can be prevented that an operator or service personnel may touch potentially hazardous parts/components of the process station or the module carrier, for example moving parts, such as a lifting device or the moving powder module being loaded or unloaded.

Thus, the opening may be sealed in that a gas exchange between the interior of the housing structure of the process station and the environment is not possible, although it is sufficient to prevent an interaction of the operator or service personnel with the interior. For example, the module carrier may be placed in front of the opening in that a gap between the module carrier and the housing structure of the process station is less than the size of a body part, e.g. the size of a hand or the size of a finger. Therefore, the positioning of the powder module in front of the opening helps to prevent injuries and therefore, significantly increases safety during operation of the plant.

Preferably, the module carrier also comprises a positioning unit, in particular a positioning unit that corresponds to the at least one positioning unit of the platform. Thus, the at least one positioning unit may be coupled or can be coupled with a corresponding positioning unit of the module carrier. Thus, via the coupling of the corresponding positioning units, i.e. the at least one positioning unit of the platform and the at least one corresponding positioning unit of the module carrier, the module carrier may be positioned in a defined relative position with respect to the opening of the housing structure of the process station. Hence, it can be assured that the module that is carried via the module carrier can be properly loaded or unloaded through the opening, as the relative position of the module carrier and the process station is assured via the positioning unit. The positioning unit provides a positioning surface via which the positioning units of the platform and the module carrier are arranged in contact, if the module carrier is placed on the platform.

According to an embodiment of the inventive plant, the at least one positioning unit may be built as or may comprise a recess and/or a protrusion, in particular cone-shaped or pyramid-shaped. In general, it is not important whether the positioning unit of the platform or the positioning unit of the at least one module carrier comprises a recess or a protrusion, but it is preferred that both positioning units comprise corresponding shapes in that the contact of the module carrier and the platform via the corresponding positioning surfaces leads to a positioning of the module carrier on the platform.

For example, if the positioning unit of the platform comprises a cone-shaped recess, the at least one module carrier preferably comprises a corresponding cone-shaped protrusion that can fit into the cone-shaped recess of the positioning unit of the platform and vice versa. Via the positioning unit comprising recesses or protrusions, it is also ensured that the upper surface of the platform which is usually used as walking area for operators or service personnel, is not simultaneously the positioning surface, but specific positioning units are provided that provide the positioning surface for positioning the module carrier(s) on the platform.

According to a preferred embodiment, each module carrier may provide four positioning units, which may be deemed as "feet" of the module carrier which can interact with the positioning units of the platform, in particular by engaging/plugging in/inserting the positioning units of the module carrier into the positioning units of the platform. Of course, an alternative embodiment, wherein the module carrier comprises recesses and the platform comprises protrusions that engage with the corresponding positioning units of the module carrier is also possible.

Further, the at least one positioning unit is movable in at least one direction, preferably movable with respect to three machine axis. Hence, the positioning unit of the platform and/or of the module carrier may be arranged on the platform and/or the module carrier in that they can be moved relative to the platform and/or the module carrier. In other words, it is possible to move the positioning unit with respect to the platform or the module carrier they are arranged on. Hence, it is possible to calibrate the position of the at least one positioning unit on the platform or the module carrier, respectively, for adjusting the relative position between the module carrier and the platform or the opening of the process station, respectively. By moving the at least one positioning unit to a corresponding nominal position, the position of the module carrier on the platform can be adjusted.

Hence, a calibration of the relative position of the at least one module carrier on the platform with respect to the opening of the process station can significantly be improved with movable positioning units that can be moved in at least one direction. Preferably each of the positioning units can be moved with respect to the three axis, e.g. an x- and y- and z-axis.

According to another embodiment of the inventive plant, the at least one positioning unit may be arranged in/on an upper surface of the platform or in a receiving section of the platform arranged in a recess in the platform. Thus, besides the alternative in which the positioning unit or the plurality of positioning unit can be arranged on the top surface of the platform, e.g. the surface of the platform which is used as walking area for an operator or service personnel, the at least one positioning unit may be arranged in a receiving section of the platform. The receiving section of the platform may be arranged in a portion of the platform which is not used as walking area, e.g. a recess in the side of the platform. Thus, it is advantageously achieved that the upper surface of the platform which is typically used as walking area is free of positioning units that may potentially pose an obstacle for personnel walking on the upper surface of the platform. Instead, it is possible to arrange the positioning units in another part of the platform, for example in a receiving section in a recess in the platform, for example at a side of the platform facing away from the process station.

In the second alternative, the module carrier may be assigned corresponding to the receiving section of the platform. For example, the module carrier may at least partially encompass the platform with the module carrier being placed on the platform, in particular on the at least one positioning unit of the platform. The at least one module carrier may comprise a shape allowing for the module carrier at least partially encompassing the receiving section.

According to another preferred embodiment of the inventive plant, the platform may be mechanically decoupled from the process station, in particular mounted or mountable to the ground. Thus, it is possible to have the platform mechanically separated from the process station, wherein there is preferably no direct mechanical connection between the platform and the assigned process station. Thus, it is advantageously possible that movements of the platform, e.g. vibrations and the like, are not transferred to the process station. For example, personal walking on the platform or the module carrier being placed on the platform, which causes movements of the platform, such as vibrations, shocks or impacts, are not transferred to the process station allowing for an improved process quality of the process performed on the process station, in particular if the process station is built as additive manufacturing apparatus, as the manufacturing process is not influenced by movements of the housing structure. The platform and the process station may be mechanically decoupled in that the platform is spaced away from the housing structure of the process station by a defined gap, e.g. 1 mm-5 cm.

The at least one process station of the plant may further comprise at least one door unit with at least one door element assigned to the at least one opening, wherein the door unit is adapted to move the at least one door element between an opened position in which the at least one door element does not cover the at least one opening and a closed position in which the at least one door element covers the at least one opening. According to this embodiment, the process station may comprise one or more door units, assigned to the at least one opening through which the powder module may be loaded into and/or unloaded from the process station.

Each door unit may comprise a door element which may be moved via the door unit between a closed position and an opened position or from an opened position to a closed position and from a closed position to an opened position, respectively. In the opened position, the at least one door element does not cover the at least one opening to which the door element is assigned. In other words, the opening is uncovered and accessible with the door element in the opened position. The closed position refers to the position in which the door element at least partially covers the at least one opening, preferably fully covers the at least one opening. Thus, for loading or unloading a powder module through the opening the door element has to be moved into the opened position, wherein after the loading or unloading process is finished, the door element may be moved back to the closed position to cover the opening and thereby the interior of the process station.

Advantageously, it is possible that the door element covers the at least one opening, if no module carrier is placed in front of the opening. Thus, if no module carrier is placed in front of the opening, the opening would be accessible to an operator or other service personnel. Hence, as the door element covers the opening in this situation, an interaction with the interior of the process station is prevented. Preferably, the at least one module carrier is placed in front of the opening and coupled with the at least one positioning unit on the platform while the door element covers the opening of the process station. After the module carrier is in place, the door element can be moved to the opened position via the corresponding door unit. Hence, the corresponding module can be loaded from the process station into the module carrier or from the module carrier into the process station with the door element in the opened position. After the loading or unloading process is finished and before the module carrier is moved away from the platform, the door element can be moved to the closed position for covering the opening. Afterwards, it is possible to remove the module carrier from the platform, wherein in every situation of the loading or unloading process, an interaction between the moving module or the interior of the process station and personnel is prevented.

The at least one a door element of the at least one door unit may be built as a roller door, preferably comprising a plurality of lamellae, in particular aluminum lamellae. Hence, the door element may be deemed as roller shutter or "garage door", which is used for opening and closing the opening in the process station and thereby, providing a gate to the process station for the at least one powder module being loaded or unloaded via the module carrier.

The at least one door unit is preferably adapted to move the at least one door element vertically, preferably downwards in opening direction and upwards in closing direction. In general, the movement direction or the movement path of the at least one door unit may be chosen arbitrarily, for example dependent on the construction of the process station, e.g. dependent on available build space, wherein an opening direction in which the at least one door element is moved downwards from the closed position to the opened position and upwards from the opened position to the closed position is preferred.

The platform of the plant may comprise at least one railing which at least partially encompasses an upper surface of the platform, preferably arranged on a side of the platform facing away from the process station. The railing may be used to prevent personnel from falling off the platform, as the platform usually is used as walking area on which personnel may access different regions of the process station, e.g. a human machine interface, a process chamber window or a glovebox or the like. By providing the railing that encompasses the upper surface, the platform which is usually higher than the ground-level onto which the platform and the process station is mounted or arranged on, an additional safety means is provided, as personnel cannot fall off the platform.

According to another embodiment of the inventive plant, the railing may comprise at least one rail unit movable between an opened and a closed position, preferably pivotable through 90°, wherein the rail unit blocks a passageway formed by the upper surface of the platform in the closed position. As described before, the upper surface of the platform may typically be used as walking area or "passageway" for personnel to access different regions of the process station. The railing which at least partially surrounds or encompasses the upper surface of the platform may comprise one or more rail units that can be moved between an opened position and a closed position. For example, each opening may have a rail unit assigned to it, which may be moved from an opened position to a closed position and vice versa. Each rail unit that is assigned to an opening may be arranged in front of the opening with respect to an unloading or a loading direction along which a powder module can be moved for loading or unloading, respectively.

For example, it is possible that each opening has a movable rail unit arranged in front of the opening, wherein the positioning unit for a corresponding module carrier may be arranged on the platform between the opening and the railing. Preferably, the at least one rail unit may be pivotable, for example through 90°, wherein the rail unit may block a passageway in the opened position, as it is possible to move the module carrier onto the platform through the railing which is opened with the rail unit in the opened position. The passageway or the walking area on top of the platform is blocked by the rail unit in the opened position. Hence, it is also possible to understand the opened position of the rail unit as a closed position with respect to the passageway. Although, in the scope of this application the term "opened position" refers to the position of the rail unit in which the rail unit blocks the passageway on top of the platform, and preferably points in the direction of the process station, e.g. points away by 90° from the rest of the railing.

The embodiment described before may further be improved in that the at least one rail unit may comprise at least one rail element, preferably two rail elements built as swing doors, in particular pivotable to opposing directions. Hence, the one or more rail elements may be considered as swing doors which can be opened to let the module carrier pass the railing and be placed on the platform to reach the defined relative position with respect to the opening in the housing structure of the process station. For example, the at least one rail element may pivot or swing about a pivot axis and, if two rail elements are provided, the rail elements may pivot or swing to opposing directions, wherein in the opened position of the rail elements the passageway formed by the upper surface of the platform is blocked to both directions adjacent to the opening and to the module carrier being placed on the platform.

The at least one rail unit may preferably be adapted to actively move into the opened position and/or into the closed position and/or may be movable manually into the opened position and/or into the closed position. Further, it is possible that the movement of the at least one rail unit from the closed position into the opened position is supported via at least one support unit, preferably a spring unit. Hence, it is preferred that the rail unit may actively move the at least one rail element or may move itself from the opened position into the closed position and/or from the closed position into the opened position. It is also possible that the movement of the rail unit is performed manually, e.g. by personnel manually moving the railing unit from the opened position into the closed position and from the closed position into the opened position. Of course an arbitrary combination of an active movement and a manual movement is possible, for example wherein a movement from the opened position into the closed position is performed actively and the movement from the closed position into the opened position is performed manually or vice versa.

Further, it is possible to provide a support unit that supports the movement of the rail unit, e.g. from the opened position to the closed position. Hence, it is possible that a module carrier that is being moved towards the platform may contact the rail unit and may push the rail unit from the closed position in which the rail unit is preferably arranged in a regular (nominal) state, e.g. in which no module carrier is placed on the platform, into the opened position. Hence, the module carrier may be moved against the rail unit, e.g. pushing onto the rail elements of the rail unit and thereby pivoting the rail elements, e.g. through 90°. After the module carrier moved the rail elements, it is possible to place the module carrier onto the platform and on the positioning unit of the platform, as described before. Preferably, after the module carrier has been removed from the platform the support unit supports the movement of the rail unit from the opened position into the closed position. Of course, the support unit may also be combined with a manual and/or active movement of the rail unit.

The inventive plant may further be improved in that the module carrier may comprise at least one moving means, in particular a guiding rail, preferably a roller conveyor, for moving the at least one powder module received in the module carrier through the at least one opening into the housing structure of the process station and/or for moving the at least one powder module from the housing structure into the module carrier. Hence, it is possible that the powder module may be moved via the moving means from the housing structure into the module carrier or from the module carrier into the housing structure of the process station, wherein the moving means is adapted to bear the powder module on the module carrier. Preferably, the moving means of the module carrier corresponds to moving means arranged inside the housing structure of the process station in that the powder module being moved from the module carrier into the housing structure is moved from the moving means of the module carrier to the moving means of the housing structure in a loading direction and vice versa in unloading direction.

The plant, in particular the process station or the module carrier may further comprise a loading means for generating a movement of the at least one powder module into the process station or from the process station. Hence, the process station or the module carrier may directly involve a loading means via which a movement of the at least one powder module may be generated allowing the powder module to move from the module carrier into the process station or from the process station into the module carrier.

The loading means may comprise an active loading element, preferably a motor or a pneumatic cylinder, or a loading opening via which a loading movement of the at least one powder module can be generated, which loading opening may preferably be arranged on a side of the module carrier facing away from the process station with the module carrier in a loading position. In other words, it is possible to have active loading elements provided by the loading means, such as a motor or a pneumatic cylinder that are adapted to actively generate a movement of the powder module received in the module carrier or arranged in the housing structure to be moved into the module carrier. Preferably, the active loading means is arranged in the process station, as the module carrier can be constructed more simple, since supply units, e.g. power supplies etc., do not have to be provided with the module carrier. It is also possible that the loading means is built as loading opening, for example on the backside of the module carrier in that an operator or service personnel may push the powder module into the process station or pull the powder module from the process station into the module carrier, e.g. via a bar-like or hook-like element.

The plant preferably comprises a process station which is built as or comprises an apparatus for additively manufacturing three-dimensional objects or the process station is a pre-processing station or the processing station is a post-processing station. As described before, the plant may comprise a plurality of process stations, such as one or more apparatuses for additively manufacturing three-dimensional objects, such as laser melting or laser sintering apparatuses or other types of additive manufacturing apparatuses. Further, the plant may comprise one or more pre-processing stations or post-processing stations. Of course, the specific setup of the plant and the number and types of process stations the plant comprises depends on the usage of the plant and can be chosen arbitrarily.

Besides, the invention relates to a platform for a plant for additively manufacturing three-dimensional objects, comprising a process station, in particular an inventive process station, as described before, wherein at least one functional component of the process station is at least partially enclosed by a housing structure of the process station, wherein the process station is coupled or can be coupled with at least one powder module, wherein the housing structure comprises at least one opening for loading and/or unloading the at least one powder module into or from the process station, wherein the platform, preferably front steps, is arrangeable or arranged adjacent to the at least one opening, wherein the platform comprises at least one positioning unit with at least one positioning surface for positioning a module carrier which is adapted to carry a powder module.

Further, the invention relates to a method for operating a plant for additively manufacturing three-dimensional objects, comprising a process station, in particular a process station according to one of the preceding claims, wherein at least one functional component of the process station is at least partially enclosed by a housing structure of the process station, wherein the process station is coupled or can be coupled with at least one powder module, wherein the housing structure comprises at least one opening for loading and/or unloading the at least one powder module into or from the process station, wherein a platform, preferably front steps, is arranged adjacent to the at least one opening, wherein the method comprises the steps:

moving a module carrier carrying a powder module to the platform lowering the module carrier onto a positioning unit of the platform positioning the module carrier via the positioning unit provided by the platform moving the powder module into the process station or from the process station into the module carrier.

Hence, it is possible to move a module carrier, e.g. which carries a powder module, to the platform, wherein it is preferably placed on the at least one positioning unit of the platform for positioning, as described before. The module carrier is lowered onto the positioning unit of the platform, wherein the positioning unit of the platform and the positioning unit of the module carrier preferably interact in that they are coupled and position the module carrier on the platform with respect to the opening of the process station. Thus, a defined relative position between the module carrier and the opening of the housing structure of the process station is assured. After the relative position between the module carrier and the opening of the housing structure of the process station has been established, the powder module may be moved from the module carrier into the process station or from the process station into the module carrier.

Preferably, the process station comprises at least one door unit with a door element, wherein the door element may be moved into an opened position before the powder module is moved into the process station or from the process station into the module carrier. After the movement of the powder module from the inside of the process station into the module carrier or vice versa, is finished, the door element can be shut in that it is moved from the opened position into the closed position. Afterwards, the module carrier can be removed from the platform.

Further, it is preferred that the platform comprises a railing with at least one rail unit, wherein the rail unit can be moved from an opened position to a closed position and vice versa. A module carrier may be moved towards the platform, wherein the rail unit can be moved to an opened position in which the rail unit blocks a passageway formed via an upper surface of the platform. Subsequently, the loading or unloading process can be performed, as described before, wherein after the loading or unloading process is finished, the module carrier can be removed from the platform and the rail unit can be moved from the opened position to the closed position. The term "blocking the passageway" is to be understood in that personnel cannot cross the movement path of the module carrier or the powder module across the platform with the rail unit in the opened position.

Self-evidently, all features, details and advantages described with respect to the inventive plant are fully transferable to the inventive platform and the inventive method and vice versa.

BRIEF DESCRIPTION OF THE DRAWINGS

Exemplary embodiments of the invention are described with reference to the FIG. The FIG. are schematic diagrams, wherein.

DETAILED DESCRIPTION

Figure 1:
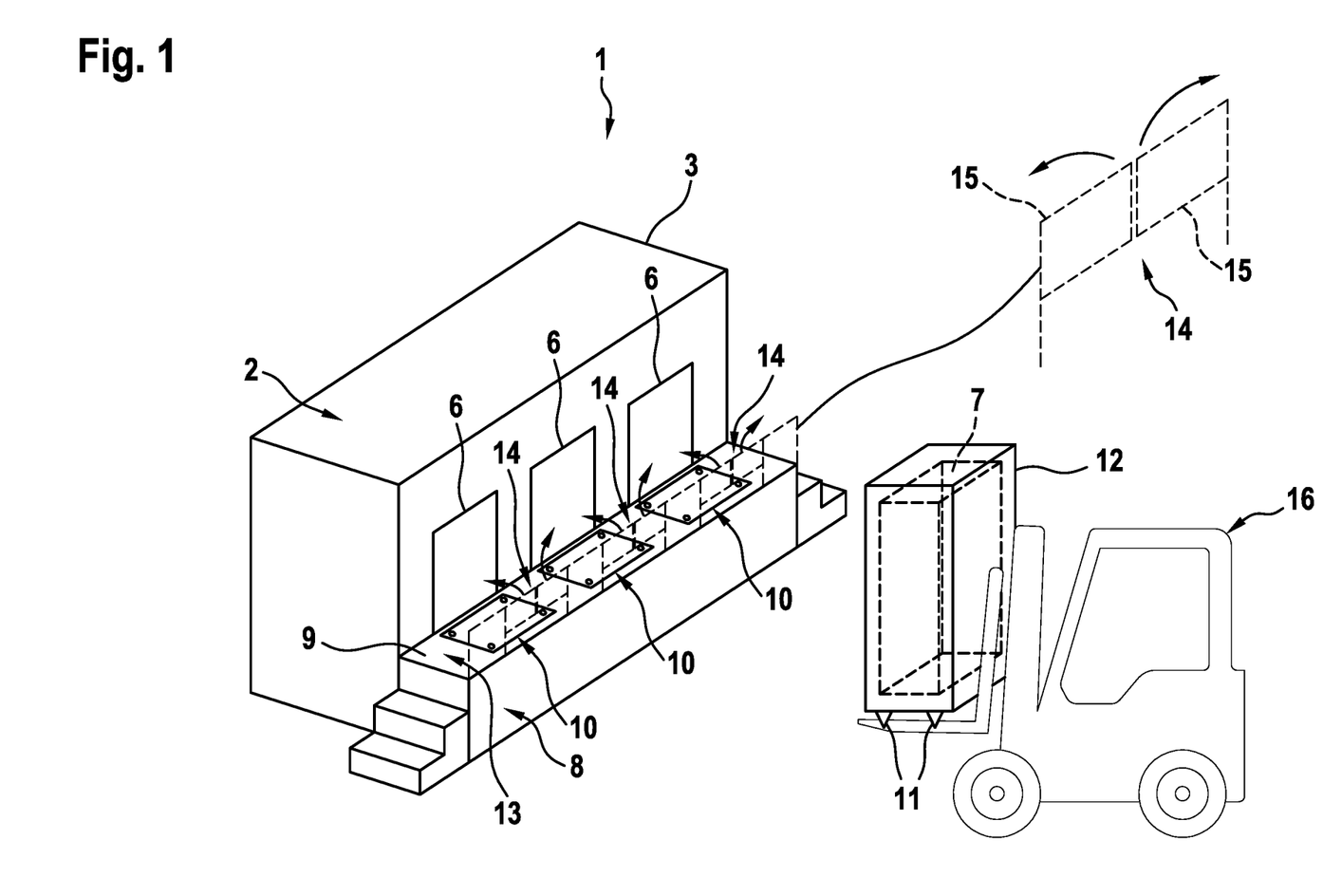
FIG. 1 shows a perspective view of an inventive plant according to a first embodiment.

FIG. 1 shows a plant 1 for additively manufacturing at least one three-dimensional object (not shown). The plant 1 comprises a process station 2 for an additive manufacturing process, which is built as additive manufacturing apparatus in this embodiment. The following description can arbitrarily be transferred to other types of process stations 2, such as pre-processing stations or post-processing stations. The process station 2 comprises a housing structure 3 that encloses at least one functional component of the process station 2, such as a functionality assembly 4, a lifting device 5 and the like. The functionality assembly 4 may, inter alia, comprise a consolidation unit, such as an irradiation device, a stream generating device, an application device via which build material may be applied in a build plane and dependent on the type of process station further functional components of the process station, such as a glovebox, a build material removal unit, pre-processing units and others.

Further, it can be derived from FIG. 1, that the process station 2 comprises three openings 6, e.g. for different types of powder modules 7, in particular dose modules, build modules and overflow modules, through which openings 6 a powder module 7 may be loaded into the process station 2 or unloaded from the process station 2, as will be described with respect to the FIGS. 2-5 below. In front of the process station 2 a platform 8 is arranged that comprises an upper surface 9 which is used as passageway or walking area for service personnel, e.g. for interacting with the process station 2 via the human machine interface, a process chamber window, a glovebox or the like (not shown).

The platform 8 further comprises positioning units 10, in particular four positioning units 10 arranged in advance to each of the openings 6. In other words, each opening 6 has four positioning units 10 arranged in front of the openings 6. The positioning units 10 can be coupled with positioning units 11 of at least one module carrier 12, wherein the positioning units 10, 11 provide a positioning surface for the corresponding positioning units 10, 11. In other words, the positioning units 10, may be built as cone-shaped recesses in the upper surface 9 of the platform 8, whereas the positioning unit 11 may be built as corresponding cone-shaped protrusions 11, wherein both positioning units 10, 11 correspond to each other in that they may be coupled for positioning the module carrier 12 in front of the respective opening 6. Thus, a defined relative position may be generated by placing the module carrier 12 in front of the respective opening 6 in that the module carrier 12 is lowered onto the positioning surface provided via the positioning units 10.

The platform 8 further comprises a railing 13 that prevents personnel from falling off the platform 8. The railing 13 comprises three rail units 14 with two rail elements 15 each that can be moved from a closed position to an opened position and vice versa. Of course, it is also possible to provide only one rail element 15, e.g. extending over the width of the module carrier 12. In the situation that is depicted in FIG. 1, the rail units 14 are arranged in a closed position, as no module carrier 12 is arranged on the platform 8. If the module carrier 12 is moved towards one of the openings 6 of the process station 2, for example via a mobile unit 16, such as a fork lift, the rail units 14 may be moved to the opened position, actively or passively, e.g. by being pushed via the module carrier 12 coming in contact with the rail elements 15. Hence, the rail elements 15 may be pivoted around a pivot axis 17 (FIG. 2) and may therefore, be moved to an opened position. Thus, the module carrier 12 may be placed in front of the openings 6 and coupled with the positioning units 10, as described before.

Figure 2:
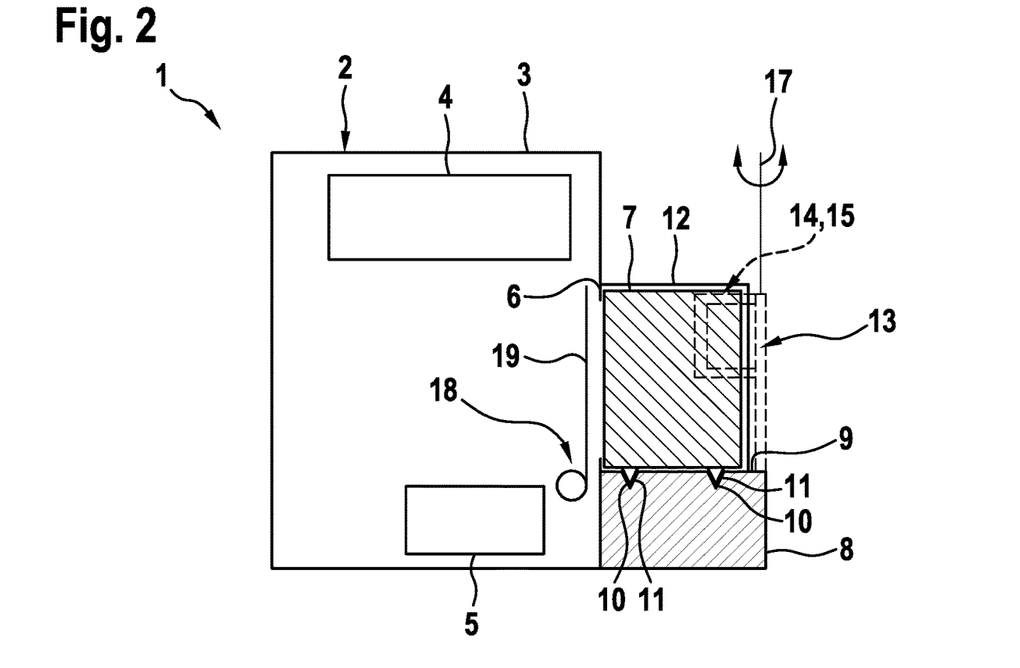
FIG. 2 shows a cross-sectional view of the inventive plant of FIG. 1 in a first situation.

In FIG. 2 a cross-sectional view onto the process station 2 and the platform 8 is depicted in a situation in which the module carrier 12 carrying the module 7 is placed on the upper surface 9 of the platform 8. As can be derived from FIG. 2, the process station 2 comprises a door unit 18 with a movable door element 19 which is arranged in a closed position in the situation that is depicted in FIG. 2. Hence, the door element 19 of the door unit 18 covers the opening 6 through which the module 7 can be loaded into the process station 2, in particular into the interior of the housing structure 3 of the process station 2. Further, it can be derived that the rail unit 14 is arranged in an opened position, wherein the rail elements 15 are pivoted through 90° compared to the situation that is depicted in FIG. 1. In this position, it is prevented that personnel can interact with the interior of the process station 2, as the module carrier 12 is placed directly in front of the opening 6. Therefore, service personnel may not come in contact with movable parts, such as the module 7 being moved into the process station 2 or movable parts inside the process station 2, such as the lifting unit 5.

Figure 3:
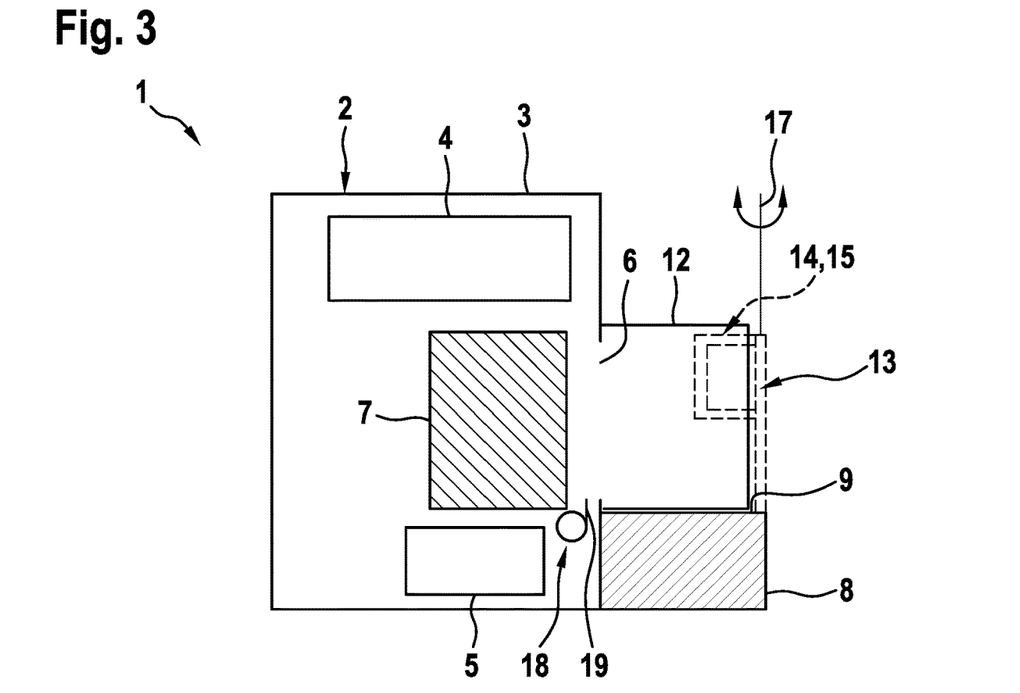
FIG. 3 shows a cross-sectional view of the inventive plant of FIG. 1 in a second situation.
Figure 4:
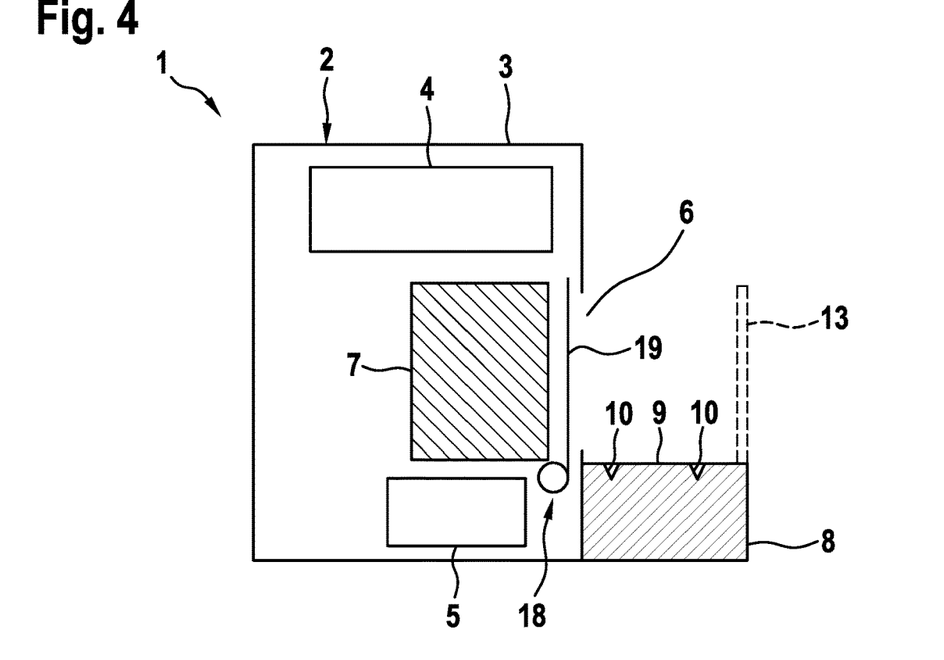
FIG. 4 shows a cross-sectional view of the inventive plant of FIG. 1 in a third situation.

For loading the module 7 from the module carrier 12 into the process station 2, the door element 19 can be moved via the door unit 18 to the opened position, as depicted in FIG. 3. In this exemplary embodiment the door element 19 is comprised of a plurality of lamellae, such as a roller shutter which can be opened by rolling the lamellae downwards. After the door unit 18 is in the opened position, e.g. the door element 19 is rolled up, the module 7 can be moved from the module carrier 12 into the process station 2. FIG. 4 depicts that after the module 7 has been moved into the housing structure 3 of the process station 2, e.g. loaded into the process station 2, the door element 19 of the door unit 18 can be moved to the closed position in which the door element 19 covers the opening 6. Hence, after the door element 19 has been shut, the module carrier 12 can be moved away from the platform 8 and the rail unit 14 can be moved to the closed position, as depicted in FIG. 1. Hence, FIG. 4 depicts the situation in which the module carrier 12 has already been removed from the process station 2 and the rail unit 14 is in that the closed position.

Of course, after the processing of the powder module 7 is finished, the powder module 7 may be removed from the process station 2 by reversing the procedure depicted in the FIGS. 2-4, e.g. by arranging an empty module carrier 12 in front of the opening 6, moving the door element 19 into the opened position, moving the powder module 7 into the module carrier 12 and closing the door element 19 again. Afterwards, the module 7 may be transported inside the module carrier 12 away from the platform 8.

Figure 5:
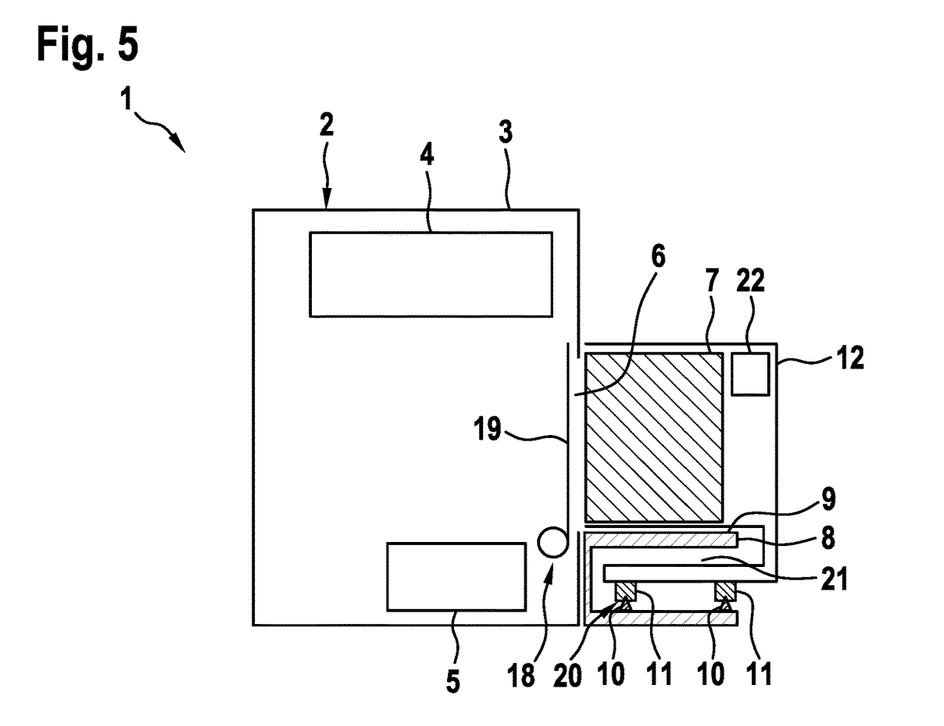
FIG. 5 shows a cross-sectional view of an inventive plant according to a second embodiment.

FIG. 5 shows an inventive plant 1 according to a second embodiment, wherein the general setup of the process station 2 is the same as depicted in the FIGS. 1-4. Therefore, same numerals are used for the same parts. In the embodiment that is depicted in FIG. 5, the platform 8 comprises a receiving section 20 in which the positioning units 10 are arranged. Hence, the module carrier 12 partially encompasses the platform 8, as the receiving section 20 is arranged in a recess 21 of the platform 8. Advantageously, it is not necessary that the positioning units 10 are arranged on the upper surface 9 of the platform 8, but it is possible to arrange the positioning units 10 in the receiving section 20 arranged in the recess 21 which is accessible via a side of the platform 8 facing away from the process station 2. Further, it is depicted that the positioning units 10 are built as protrusions and the positioning unit 11 of the module carrier 12 are built as recesses. Of course, an arbitrary combination of positioning units 10, 11 built as recesses and/or protrusions is possible also with the setup depicted in FIGS. 1-4. Of course, the embodiment depicted in FIG. 5 can also be combined with a railing 13, as described with respect to the embodiments depicted in the FIGS. 1-4.

As can also be derived from FIG. 5, the plant 1 comprises a loading means 22 arranged in the module carrier 12 or coupled with the module carrier 12, respectively. Via the loading means 22 it is possible to generate a movement of the powder module 7 in loading direction or unloading direction, e.g. for moving the powder module 7 which is received/carried inside the module carrier 12 into the process station 2 or to generate the movement of the powder module 7 arranged in the process station 2 into the module carrier 12. In particular, it is possible to load and unload the powder module 7 via the loading means 22, of course while the door element 19 is in an opened position. Further, it is possible that the module carrier 12 depicted in the FIGS. 1-4 also comprises a loading means 22. Further, the loading means 22 may also be arranged in the process station 2 for generating a movement of the powder module 7 from the module carrier 12 into the process station 2 or from the process station 2 into the module carrier 12. Hence, the movement of the powder module 7 in loading direction and unloading direction may be generated via the loading means 22, wherein the loading means 22 may be arranged in the process station 2 or in the at least one module carrier 12.

Further, the platform 8 throughout the depicted embodiments may be mounted to the ground and mechanically decoupled from the process station 2, wherein it is advantageously possible that mechanical vibrations or even impacts or shocks introduced via the module carrier 12 being placed on the positioning surfaces provided via the positioning units 10, 11 is not transferred to the process station 2. Further, movements of personnel caused by walking on the upper surface 9 of the platform 8 are also not transferred to the process station 2, which is, for example, built as additive manufacturing apparatus. Therefore, the process performed on the process station 2 is not negatively influenced by mechanical movements of the platform 8.

Of course, the inventive method may be performed on the inventive plants 1 depicted in the FIGS. 1-5. All details, features and advantages described with respect to the individual embodiments are fully transferable and can arbitrarily combined and exchanged.

The invention claimed is:

1. A method for operating a plant for additively manufacturing three-dimensional objects, comprising a process station wherein a functional component of the process station is at least partially enclosed by a housing structure of the process station, wherein a platform comprising at least one of a railing, pedestal, podium, or stairs configured to facilitate human interaction with the at least one process station is arranged adjacent to the at least one opening, wherein the method comprises:
 coupling the process station with at least one powder module;
 loading and/or unloading the at least one powder module through at least one opening in the housing structure into or from the process chamber;
 controlling a position, within the housing structure, of the at least one powder module and/or a build material therein with the functional component;
 moving a module carrier carrying a powder module to the platform;
 lowering the module carrier onto a positioning unit of the platform;
 positioning the module carrier via the positioning unit provided by the platform; and
 moving the powder module into the process station or from the process station into the module carrier.

2. A plant for additively manufacturing at least one three-dimensional object, the plant comprising:
 at least one process station for an additive manufacturing process,
 a functional component of the process station,
 a housing structure of the at least one process station configured to at least partially enclose the functional component,
 at least one powder module configured for coupling with the at least one process station, wherein the functional component is configured to control a position, within the housing structure, of the at least one powder module and/or a build material therein,
 at least one opening of the housing structure configured for loading and/or unloading the at least one powder module into or from the process station, and
 a platform arrangeable or arranged adjacent to the at least one opening, wherein the platform comprises:
  at least one positioning unit with at least one positioning surface for positioning a module carrier which is adapted to carry the at least one powder module; and
  at least one of a railing, pedestal, podium, or stairs configured to facilitate human interaction with the at least one process station.

3. The plant according to claim 2, wherein the at least one positioning unit is coupled or can be coupled with a corresponding positioning unit of the module carrier.

4. The plant according to claim 2, wherein the at least one positioning unit is built as or comprises a recess and/or a protrusion.

5. The plant according to claim 2, wherein the at least one positioning unit is movable in at least one direction.

6. The plant according to claim 2, wherein the at least one positioning unit is arranged on an upper surface of the platform or in a receiving section of the platform arranged in a recess in the platform.

7. The plant according to claim 2, wherein the platform is mechanically decoupled from the process station.

8. The plant according to claim 2, wherein the process station comprises at least one door unit, at least one door element assigned to the at least one opening, wherein the at least one door unit is adapted to move the at least one door element between an opened position in which the at least one door element does not cover the at least one opening and a closed position in which the at least one door element covers the at least one opening.

9. The plant according to claim 8, wherein the at least one door element is built as roller door.

10. The plant according to claim 8, wherein the at least one door unit is adapted to move the at least one door element vertically downwards in an opening direction and upwards in a closing direction.

11. The plant according to claim 2, wherein the platform comprises at least one railing at least partially encompassing an upper surface of the platform.

12. The plant according to claim 11, wherein the railing comprises at least one rail unit movable between an opened and a closed position, wherein the at least one rail unit blocks a passageway formed by the upper surface of the platform in the opened position.

13. The plant according to claim 11, wherein the at least one rail unit comprises at least two rail elements built as swing doors pivotable to opposing directions.

14. The plant according to claim 12, wherein the at least one rail unit is adapted to actively move into the opened position and/or into the closed position and/or is movable manually into the opened position and/or into the closed position and/or the movement of the at least one rail unit from the opened position into the closed position is supported via at least one support unit.

15. The plant according to claim 2, wherein the module carrier comprises at least one moving unit configured for moving the at least one powder module received in the module carrier through the at least one opening into the housing structure of the process station and/or for moving the at least one powder module from the housing structure into the module carrier.

16. The plant according to claim 2, wherein the plant comprises a loading unit configured for generating a movement of the at least one powder module into the process station or from the process station.

17. The plant according to claim 16, wherein the loading unit comprises an active loading element or a loading opening via which a loading movement of the at least one powder module can be generated.

18. The plant according to claim 2, wherein the process station is an apparatus for additively manufacturing three-dimensional objects or a pre-processing station or a post-processing station.

19. The plant according to claim 2, wherein the functional component comprises a lifting device configured for lifting the at least one powder module to an operational position.

20. A platform for a plant for additively manufacturing three-dimensional objects, the platform comprising:
a process station wherein a functional component of the process station is at least partially enclosed by a housing structure of the process station, the functional component configured to control a position, within the housing structure, of at least one powder module and/or a build material therein, wherein the process station is coupled or can be coupled with the at least one powder module, wherein the housing structure comprises at least one opening for loading and/or unloading the at least one powder module into or from the process station, wherein the platform is arrangeable or arranged adjacent to the at least one opening;
at least one positioning unit with at least one positioning surface for positioning a powder module carrier which is adapted to carry the at least one powder module; and
at least one of a railing, pedestal, podium, or stairs configured to facilitate human interaction with the at least one process station.

* * * * *